(12) United States Patent
Andou et al.

(10) Patent No.: US 7,699,397 B2
(45) Date of Patent: Apr. 20, 2010

(54) SEAT RECLINING DEVICE

(75) Inventors: Kimitaka Andou, Toyota (JP); Takeshi Ohwaki, Toyota (JP); Hitoshi Suga, Nagoya (JP); Keiichiro Inoue, Toyota (JP)

(73) Assignees: Toyota Boshoku Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 150 days.

(21) Appl. No.: 12/065,371

(22) PCT Filed: Aug. 22, 2006

(86) PCT No.: PCT/JP2006/316401
§ 371 (c)(1),
(2), (4) Date: Feb. 29, 2008

(87) PCT Pub. No.: WO2007/026571
PCT Pub. Date: Mar. 8, 2007

(65) Prior Publication Data
US 2009/0134682 A1   May 28, 2009

(30) Foreign Application Priority Data
Aug. 30, 2005   (JP)   ............................. 2005-248949

(51) Int. Cl.
*B60N 2/00* (2006.01)
*B60N 2/10* (2006.01)
(52) U.S. Cl. .............................. 297/354.12; 297/367 R
(58) Field of Classification Search ............ 297/216.13, 297/216.14, 367 R, 367 P, 354.12, 361.1, 297/362.11
See application file for complete search history.

(56) References Cited

U.S. PATENT DOCUMENTS

| 5,749,624 | A  | * | 5/1998  | Yoshida ................... | 297/367 R |
| 6,505,889 | B2 | * | 1/2003  | Frolo et al. ............ | 297/354.12 |
| 6,523,893 | B2 | * | 2/2003  | Kamper et al. ......... | 297/216.13 |
| 7,150,502 | B2 |   | 12/2006 | Toba et al.             |           |
| 7,527,334 | B2 | * | 5/2009  | Kiehler et al. ......... | 297/216.13 |

(Continued)

FOREIGN PATENT DOCUMENTS

EP        1273474        1/2003

(Continued)

OTHER PUBLICATIONS

English language Abstract of JP2004-290243.

(Continued)

*Primary Examiner*—David Dunn
*Assistant Examiner*—James Alex
(74) *Attorney, Agent, or Firm*—Greenblum & Bernstein, P.L.C.

(57) ABSTRACT

In a seat reclining device, reclining mechanisms that are respectively provided on right and left sides of a seat are constructed such that locking and unlocking motion thereof can be performed in synchronism with each other via a connection member. A connection structure of the connection member and a operation shaft is constructed as a transmission preventing mechanism for preventing transmission of the unlocking motion between the reclining mechanisms when a load is laterally disproportionately applied to the seat back in which the reclining mechanisms are in a locking condition such that a relatively different rotational displacement that permits to release the locking condition is generated between the reclining mechanisms that are arranged in rotationally synchronism with each other.

5 Claims, 9 Drawing Sheets

U.S. PATENT DOCUMENTS

| | | |
|---|---|---|
| 2002/0125755 A1* | 9/2002 | Frolo et al. ............... 297/367 |
| 2002/0185903 A1 | 12/2002 | Hosokawa |
| 2004/0084945 A1 | 5/2004 | Toba et al. |
| 2006/0145522 A1 | 7/2006 | Yamada |

FOREIGN PATENT DOCUMENTS

| | | |
|---|---|---|
| EP | 1462301 | 9/2004 |
| JP | 2000-43625 | 2/2000 |
| JP | 2000-185582 | 7/2000 |
| JP | 2002-360368 | 12/2002 |
| JP | 2003-70584 | 3/2003 |
| JP | 2004-81390 | 3/2004 |
| JP | 2004-290243 | 10/2004 |

OTHER PUBLICATIONS

English language Abstract of JP 2003-70584.
English language Abstract of JP 2002-360368.
English language Abstract of JP 2000-43625.
English language Abstract of JP 2000-185582.
English language Abstract of JP 2000-81390.

* cited by examiner

SEAT RECLINING DEVICE

TECHNICAL FIELD

The present invention relates to a seat reclining device. More specifically, the present invention relates to a seat reclining device in which reclining mechanisms for adjusting an inclination angle of a seat back are respectively disposed on right and left sides of a seat, and in which a transmission member is disposed between the right and left reclining mechanisms in order to synchronize locking and unlocking operations of the two reclining mechanisms.

BACKGROUND ART

Conventionally known seat reclining devices having reclining mechanisms that is capable of adjusting an inclination angle of a seat back of a vehicle seat are disclosed, for example, in Japanese Laid-Open Patent Publications Nos. 2000-43625 and 2002-360368.

In the seat reclining device disclosed in the former document, operating cables are connected to the reclining mechanisms provided on right and left sides of the seat in order to individually lock and unlock these reclining mechanisms. Further, the operation cables are connected to a single releasing lever. Therefore, by operating the single releasing lever, it is possible to perform locking and unlocking operations of the reclining mechanisms in synchronism with each other on the right and left sides. However, the structure in which a plurality of operating cables are used has a problem because relatively high costs are involved. Further, because the individual operating cables have respectively different length, the operation cables may have different amounts of elongation when they are operated. This may result in a problem because a gap in operation timing of the two reclining mechanisms can be produced.

In the seat reclining device disclosed in the latter document, operation shafts for performing locking and unlocking operations of the right and left reclining mechanisms are connected to each other via a connection member so as to transmit rotational motion therebetween. Therefore, upon operation of one of the operation shafts, the rotational motion thereof is transmitted to the other of the operation shafts. As a result, the locking and unlocking operations of the right and left reclining mechanisms can be conducted in synchronism with each other. Transmission of an operational force via the connection member is secured by torsional rigidity of the connection member. According to this structure, as compared with the above-mentioned structure using a plurality of operating cables, relatively low costs and reduced numbers of parts are involved. In addition, it is preferred because a gap in operation timing of the two reclining mechanisms cannot be easily produced.

DISCLOSURE OF THE INVENTION

Problem to be Solved by the Invention

However, in the above-mentioned prior-art technique, that is, in the seat reclining device disclosed in the latter document, when a relatively large load is input to the seat back from a rear side of the vehicle, a locking condition of one of the reclining mechanisms may be released.

For example, when due to a vehicle collision, a heavy object placed in a luggage compartment behind a rear seat hits a back surface of the seat back, the seat back can be pressed in a forward tilting direction so as to be deformed or displaced. As a result, due to the deformation or displacement of the seat back, the reclining mechanisms that is maintained in the locking condition can be rotated therewith in the forward tilting direction around the operation shafts. At this time, if the load applied to the seat back is disproportionately exerted on the left and right sides of the seat back, a relative rotational position of one of the reclining mechanisms that is widely rotated can be deviated from a relative rotational position of the other of the reclining mechanisms that is not widely rotated. As a result, the connection member connecting the two operation shafts of the reclining mechanisms may rotate with one of the reclining mechanisms, so as to transmit the operational force to the operation shaft of the other of the reclining mechanisms, thereby unlocking the same.

The present invention has been made in order to solve the above-mentioned problem. It is an object of the present invention to prevent the locking condition of the reclining mechanisms from releasing when a substantial load is applied so that the relative rotational positions of the reclining mechanisms can be deviated from each other.

Means for Solving the Problem

In order to achieve the above-mentioned object, the seat reclining device of the present invention is constructed as follows.

First, a first invention provides a seat reclining device including reclining mechanisms that are respectively provided on right and left sides of a seat so as to adjust an inclination angle of a seat back, and a transmission member that is disposed between the right and left reclining mechanisms in order to synchronize locking and unlocking motion of the reclining mechanisms. The transmission member is provided with a transmission preventing mechanism for preventing transmission of the unlocking motion between the reclining mechanisms when a load is laterally disproportionately applied to the seat back in which the reclining mechanisms are in a locking condition such that a relatively different rotational displacement that permits to release the locking condition is generated between the reclining mechanisms that are arranged in rotationally synchronism with each other.

According to the first invention, when the load is laterally disproportionately applied to the seat back such that the relatively different rotational displacement that permits to release the locking condition is generated between the reclining mechanisms, the transmission of the unlocking motion between the reclining mechanisms can be prevented by the transmission preventing mechanism. Therefore, each of the reclining mechanisms can maintain the locking condition if the relatively different rotational displacement as described above is generated.

Next, according to a second invention, in the first invention, the transmission member disposed between the right and left reclining mechanisms includes operation shafts for respectively operating the locking and unlocking motion of the right and left reclining mechanisms, and a connection member that is disposed between the right and left operation shafts and connects these operation shafts so as to transmit the operation therebetween. The transmission preventing mechanism for preventing transmission of the unlocking motion between the reclining mechanisms is provided on at least one of the operation shafts and the connection member. When the load is laterally disproportionately applied to the seat back in which the reclining mechanisms are in the locking condition, and when the load has a magnitude such that one of the reclining mechanisms relatively rotates with respect to the other of the reclining mechanisms, so as to produce a relative rotational displacement that permits to release the locking condition of the other of the reclining mechanisms, the transmission preventing mechanism is deformed or displaced by an action of the load, so that a torsional rotational force having a magnitude corresponding to the load can be prevented from transmitting between the operation shafts of the reclining mechanisms via the connection member.

According to the second invention, when the load is laterally disproportionately applied to the seat back, the transmission preventing mechanism is deformed or displaced. Due to this deformation or displacement, an operational force (the torsional rotational force) can be prevented from transmitting between the operation shafts via the connection member.

Next, according to a third invention, in the second invention, the transmission preventing mechanism is provided on the connection member.

Here, the connection member is separately disposed between the operation shafts in order to connect the operation shafts provided on the reclining mechanisms each other. Therefore, the connection member having a length corresponding to a width of the seat is selected and used.

According to the third invention, the connection member is deformed or displaced when the load laterally disproportionately applied to the seat back is acted thereon. As a result, the operational force (the torsional rotational force) can be prevented from transmitting between the operation shafts via the connection member.

Next, according to a fourth invention, in the second invention, the transmission preventing mechanism is provided on the operation shafts of the reclining mechanisms.

According to the fourth invention, the operation shafts are deformed or displaced when the load laterally disproportionately applied to the seat back is acted thereon. As a result, the operational force (the torsional rotational force) can be prevented from transmitting between one of the operation shafts and the other of the operation shafts.

Next, according to a fifth invention, in any one of the second to fourth inventions, a connection structure of the connection member and the operation shafts for operating the reclining mechanisms comprises a coupling joint in which axial end portions of the connection member and the operation shafts are insertion-coupled to each other. Although the reclining mechanisms are disposed such that axes of their operation shafts are normally aligned with each other, the reclining mechanisms can be deformed or displaced such that the axes of their operation shafts are bent in a V-shape when the action of the load is applied thereto. The transmission preventing mechanism is constructed such that an insertion-coupling condition between the connection member and the operation shafts in the coupling joint is formed as a coupling condition in which they can be bent to a V-shaped bent angle that can prevent transmission of a rotational motion between the reclining mechanisms.

Here, the construction in which the coupling joint is bent in the V-shape according to the magnitude of the load can be set, for example, by adjusting the coupling of the operation shafts and the connection member or a distance of the insertion-coupling.

According to the fifth invention, the coupling joint in which the connection member and the operation shafts are insertion-coupled can be bent to the V-shaped bent angle that can prevent the transmission of the rotational motion therebetween.

Next, according to a sixth invention, in any one of the second to fourth inventions, a connection structure of the connection member and the operation shafts for operating the reclining mechanisms comprises a coupling joint in which axial end portions of the connection member and the operation shafts are insertion-coupled to each other. Although the reclining mechanisms are disposed such that axes of their operation shafts are normally aligned with each other, the reclining mechanisms can be deformed or displaced such that the axes of their operation shafts are bent in a V-shape when the action of the load is applied thereto. The transmission preventing mechanism is constructed such that an insertion-coupling condition between the connection member and the operation shafts in the coupling joint can be decoupled when it reaches a desired V-shaped bent angle.

Here, the construction in which the coupling joint is bent in the V-shape according to the magnitude of the load can be set, for example, by adjusting the coupling of the operation shafts and the connection member or a distance of the insertion-coupling.

According to the sixth invention, the coupling joint in which the connection member and the operation shafts are insertion-coupled can be bent to the V-shaped bent angle that can prevent the transmission of the rotational motion therebetween.

Next, according to a seventh invention, in the fifth or sixth invention, the transmission preventing mechanism includes a deformation promoting portion formed in at least one of the connection member and the operation shafts that constitute the coupling joint. The coupling joint in the coupling condition can be easily bent to the V-shape due to the deformation promoting portion.

Here, specific examples of the deformation promoting portion may include a construction for promoting deformation by stress concentration that can be performed by partially weakening or thinning the structural components, or forming a cutout portion or a slot therein.

According to the seventh invention, deformability of the coupling joint can be adjusted by the deformation promoting portion formed in at least one of the connection member and the operation shafts.

Next, according to an eighth invention, in any one of the first to seventh inventions, the reclining device is disposed between the seat back and a seat cushion. The seat back and the seat cushion are connected to the reclining mechanisms at positions that are spaced away from each other in a lateral direction of the seat by a distance corresponding to a thickness of the reclining mechanisms. The transmission preventing mechanism is constructed such that one of cushion frames constituting a frame of the seat cushion laterally relatively rotates with respect to the other of the cushion frames, thereby deflecting the operation shafts for respectively operating the locking and unlocking motion of the right and left reclining mechanisms.

According to the eighth invention, when the load is laterally disproportionately applied to the seat back, a load is laterally disproportionately applied to one of the cushion frames constituting the frame of the seat cushion. As a result, one of the cushion frames laterally relatively rotates with respect to the other of the cushion frames, thereby deflecting the operation shafts, so that the transmission of the unlocking motion via the transmission member can be prevented

EFFECTS OF THE INVENTION

The present invention may have following effects based upon the above-mentioned means.

First, according to the first invention, when a large load that can generate a relatively different rotational displacement between the reclining mechanisms is input, the transmission of the unlocking motion between the reclining mechanisms can be prevented by the transmission preventing mechanism. Therefore, the locking condition of the reclining mechanisms can be prevented from being released.

Further, according to the second invention, it is possible to realize the first invention using a simple construction in which at least one of the operation shaft and the connection member is deformed or displaced when the load is laterally disproportionately applied to the seat back.

Further, according to the third invention, because the connection member that is separately disposed between the operation shafts is deformed or displaced, the transmission of the unlocking motion can be prevented without changing the construction of the conventional reclining mechanisms.

Further, according to the fourth invention, the transmission of the unlocking motion can be prevented by a simple setting in which a diameter of the operation shaft is changed.

Further, according to the fifth invention, the transmission of the unlocking motion can be prevented by a simple setting in which the coupling joint is bent in the V-shape.

Further, according to the sixth invention, the transmission of the unlocking motion can be prevented by releasing the coupling condition in such a manner that the coupling joint is bent in the V-shape.

Further, according to the seventh invention, because the deformation promoting portion is formed in the coupling joint, the coupling joint can be stably changed to a condition that can prevent the transmission of the unlocking motion.

Further, according to the eighth invention, the transmission of the unlocking motion can be advantageously prevented by utilizing the deforming or displacing motion of the operation shafts of the reclining mechanisms in relation to a connection structure of the seat back and the seat cushion.

DESCRIPTION OF REFERENCE SYMBOLS

| | |
|---|---|
| 1 | seat |
| 2 | seat back |
| 2f | back frame |
| 2a | dowel hole |
| 3 | seat cushion |
| 3f | cushion frame |
| 3a | dowel hole |
| 10A, 10B | reclining mechanism |
| 11 | ratchet |
| 11a | inner tooth |
| 11c | through-hole |
| 11d | dowel |
| 12 | guide |
| 12e | surrounding portion |
| 12g | recess |
| 12c | through-hole |
| 12d | dowel |
| 13 | pawl |
| 13a | outer tooth |
| 13b | groove |
| 13c | engagement portion |
| 13d | leg portion |
| 14 | extrusion member |
| 14a | hook portion |
| 14b | depressed portion |
| 14c | shoulder portion |
| 14d | through-hole |
| 15 | cam member |
| 15a | protrusion |
| 16A, 16B | operation shaft |
| 16Ar, 16Br | insertion end portion |
| 17 | set plate |
| 18 | spiral spring |
| 20 | connection member |
| 21 | coupling end portion |
| 22 | coupling end portion |
| A1, A2 | axis |
| T | operation lever |
| H | operation lever |
| t1 | inner diameter |
| t2 | outer diameter |
| c1 | gap |
| c2 | gap |
| w1 | width |
| w2 | width |
| i | insertion amount |
| Sa | cutout portion (deformation promoting portion) |
| Sb | slot (deformation promoting portion) |
| Sc | slot (deformation promoting portion) |
| Sd | small diameter portion (deformation promoting portion) |

BEST MODES FOR CARRYING OUT THE INVENTION

In the following, the best modes for carrying out the present invention will be described with reference to the drawings.

First Embodiment

First, a seat reclining device according to a first embodiment will be described with reference to FIGS. 1 to 9.

Figure 1:
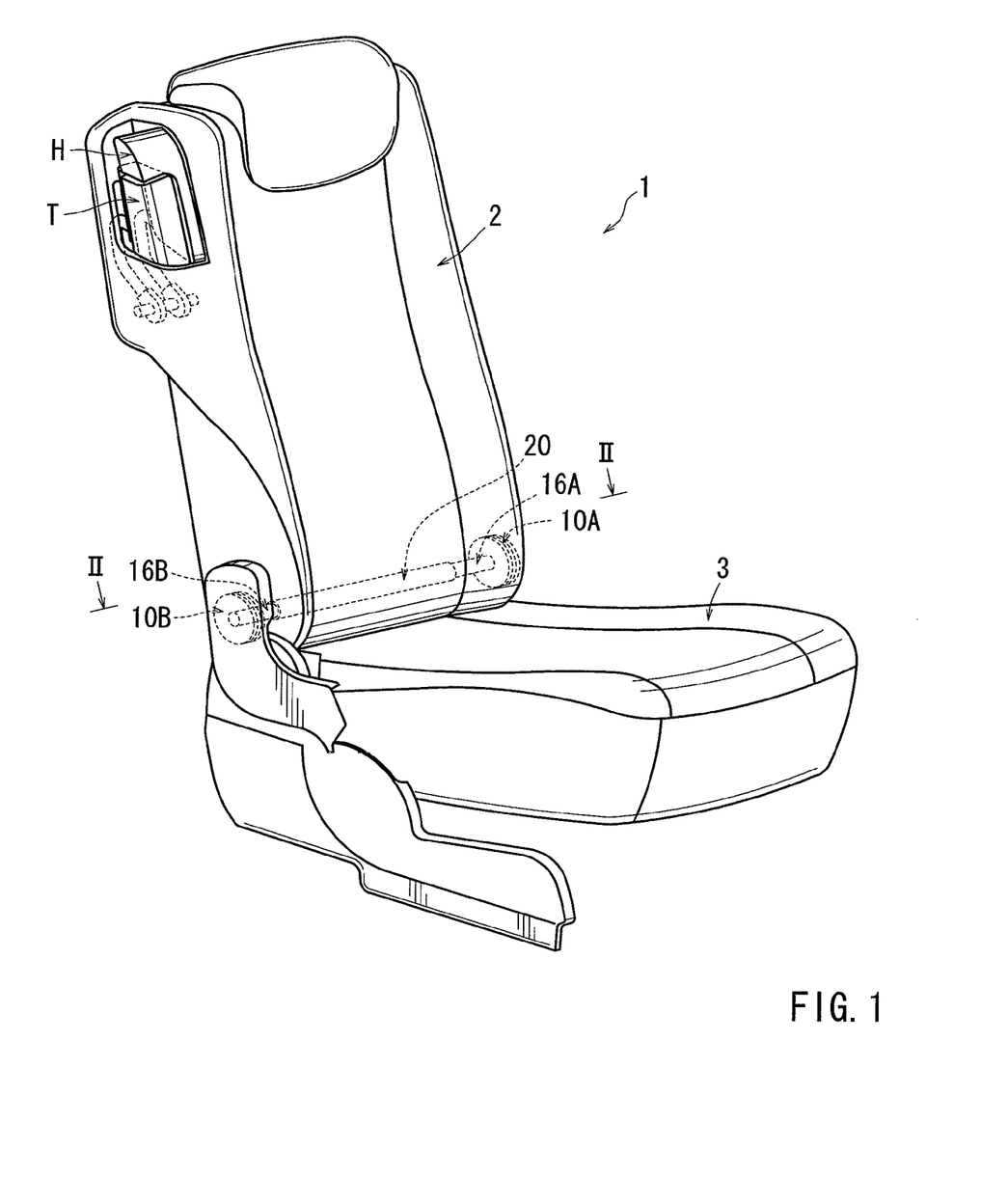
FIG. 1 is a perspective view of a seat according to a first embodiment, which illustrates a general construction of the seat.

As shown in FIG. 1, the seat reclining device of this embodiment is applied to a seat 1 that is arranged as a rear seat of a vehicle. In this seat reclining device, a seat back 2 and a seat cushion 3 respectively constituting a backrest portion and a seating portion of the seat 1 are connected by a pair of reclining mechanisms 10A and 10B that are disposed on both sides in their width direction.

The reclining mechanisms 10A and 10B is constructed so as to be switched between an unlocking condition in which a tilting angle of the seat back 2 can be adjusted and a locking condition in which the tilting angle can be fixedly maintained. Switching between the locking condition and the unlocking condition of the reclining mechanisms 10A and 10B can be performed via rotation of operation shafts 16A and 16B that are respectively positioned at centers of the reclining mechanisms 10A and 10B. Now, the operation shafts 16A and 16B are connected to an elongated connection member 20 that is disposed therebetween, so that their axial rotating motions can be mutually transmitted therebetween. Thus, the operation shafts 16A and 16B can be integrally axially rotated. As a result, the switching between the locking condition and the unlocking condition of the reclining mechanisms 10A and 10B can be simultaneously performed.

Now, the reclining mechanisms 10A and 10B, in a normal condition in which the operation shafts 16A and 16B are not yet axially rotated, are maintained in the locking condition in which the tilting angle of the seat back 2 can be fixedly maintained. Further, the reclining mechanisms 10A and 10B can be simultaneously switched to the unlocking condition by forwardly tilting an operation lever T and an operation lever H that are arranged at an outer shoulder portion of the seat back 2.

Figure 6:
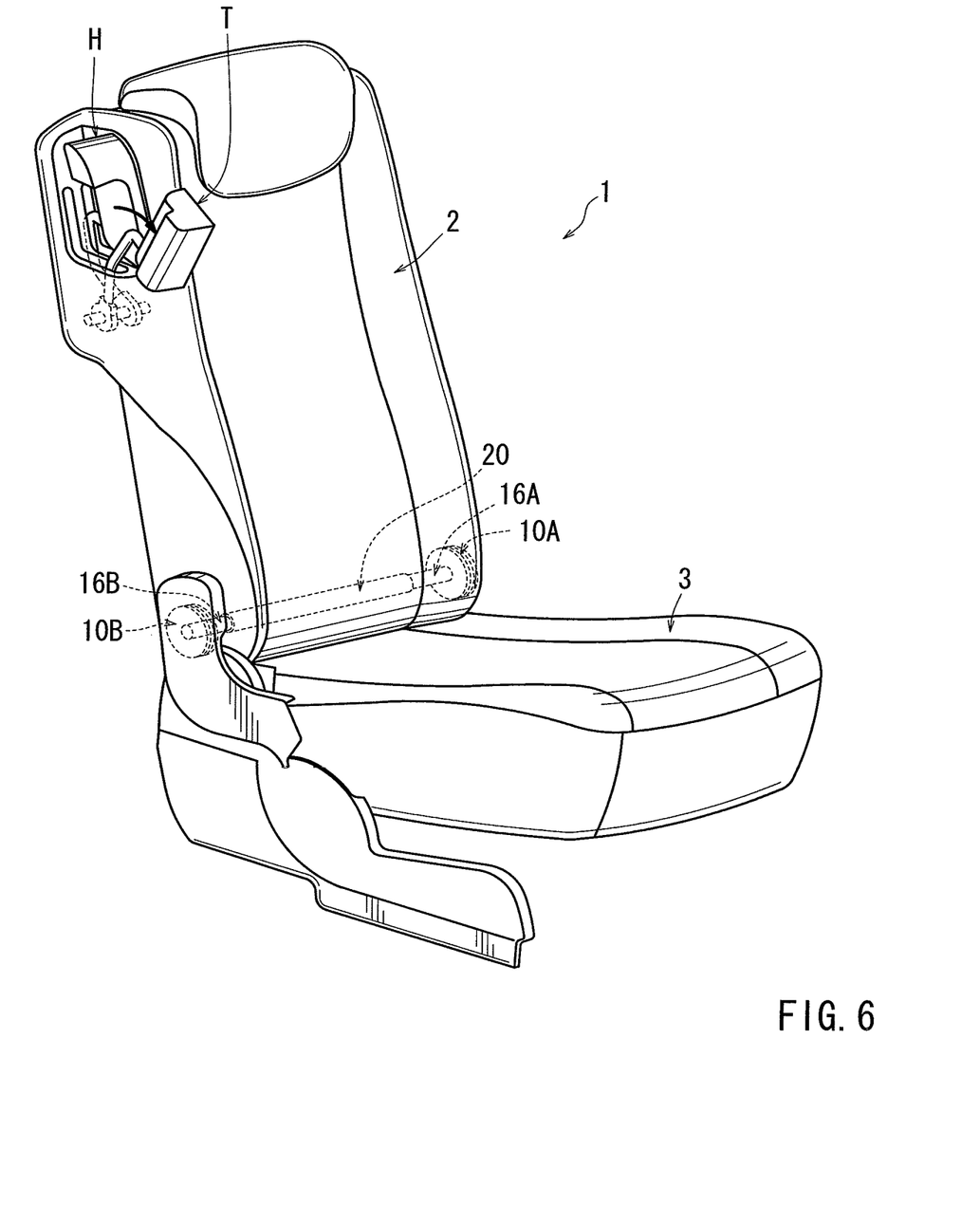
FIG. 6 is a perspective view, which illustrates a condition in which a tilt down operation lever is operated.

The operation levers T and H are connected to the operation shaft 16B, which is positioned at a left-hand side as seen in FIG. 1. Thus, the left-hand operation shaft 16B can be axially rotated in an unlocking direction by forwardly tilting those levers. Now, FIG. 6 shows a condition in which the operation lever T is forwardly tilted. At this time, the right-hand operation shaft 16A is also axially rotated in an unlocking direction, so that the reclining mechanisms 10A and 10B are simultaneously switched to the unlocking condition.

Now, the operation lever T is intended to switch the seat 1 to a tilt-down condition. That is, the operation lever T can switch the seat 1 to a folded condition by forwardly tilting the same, so that the seat 1 can be retracted onto the floor. Further, the operation lever H is intended to switch the seat 1 to a condition in which it is capable of walking in. That is, the operation lever H can switch the seat back 2 to a forwardly tilted condition and can slide the entire seat 1 forwardly of the vehicle by forwardly tilting the same. Thus, the seat 1 can be placed in a desired condition in which a person can easily get in and out of a seat (not shown) positioned behind it.

In the seat 1 thus constructed, when, for example, due to a vehicle collision, a heavy object such as a wine case placed behind the seat 1 hits a back surface of the seat back 2, the seat back 2 can be pressed in a forward tilting direction so as to be deformed or displaced. As a result, due to the deformation or displacement of the seat back 2, the reclining mechanisms 10A and 10B that is maintained in the locking condition can be rotated therewith in the forward tilting direction.

At this time, if a load applied to the seat back 2 is offset from a widthwise center of the seat 1 so as to be disproportionately exerted on one side of the seat back 2, a relative rotational position of one of the reclining mechanisms (e.g., the reclining mechanism 10A) that is widely rotated can be deviated from a relative rotational position of the other of the reclining mechanisms (e.g., the reclining mechanism 10B) that is not widely rotated. As a result, the connection member 20 connecting the two operation shafts 16A and 16B of the reclining mechanisms may rotate with one of the reclining mechanisms 10A, so as to transmit an operational force to the operation shaft 16B of the other of the reclining mechanisms 10B, thereby rotating the same. Thus, the operation shaft 16B relatively axially rotates in the unlocking direction with respect to the reclining mechanism 10B that has a smaller amount of rotational displacement, so that the reclining mechanism 10B can be switched to the unlocking condition.

However, in the seat reclining device of this embodiment, when a relatively different rotational displacement that permits to release the locking condition is generated between the reclining mechanisms 10A and 10B, unlocking motion can be prevented from transmitting between the reclining mechanisms 10A and 10B.

More specifically, in the seat reclining device, when the load as mentioned above is input, transmission of a rotational force between the operation shafts 16A and 16B via the connection member 20 can be blocked. As a result, the other of the operation shafts 16B is prevented from relatively rotating in the unlocking direction with respect to the reclining mechanism 10B.

In the following, the above-mentioned constructions will be described in detail.

First, the construction of the reclining mechanisms 10A and 10B will be described. Although the reclining mechanisms 10A and 10B are laterally symmetrically arranged, they have substantially the same constructions as each other. Therefore, in the following description, only constructions of one of the reclining mechanisms 10A will be described, and a description with regard to constructions of the other of the reclining mechanism 10B will be omitted. Further, the reclining mechanisms 10A and 10B shown therein have well-known constructions as described, for example, in Japanese Laid-Open Patent Publication No. 2002-360368.

Figure 7:
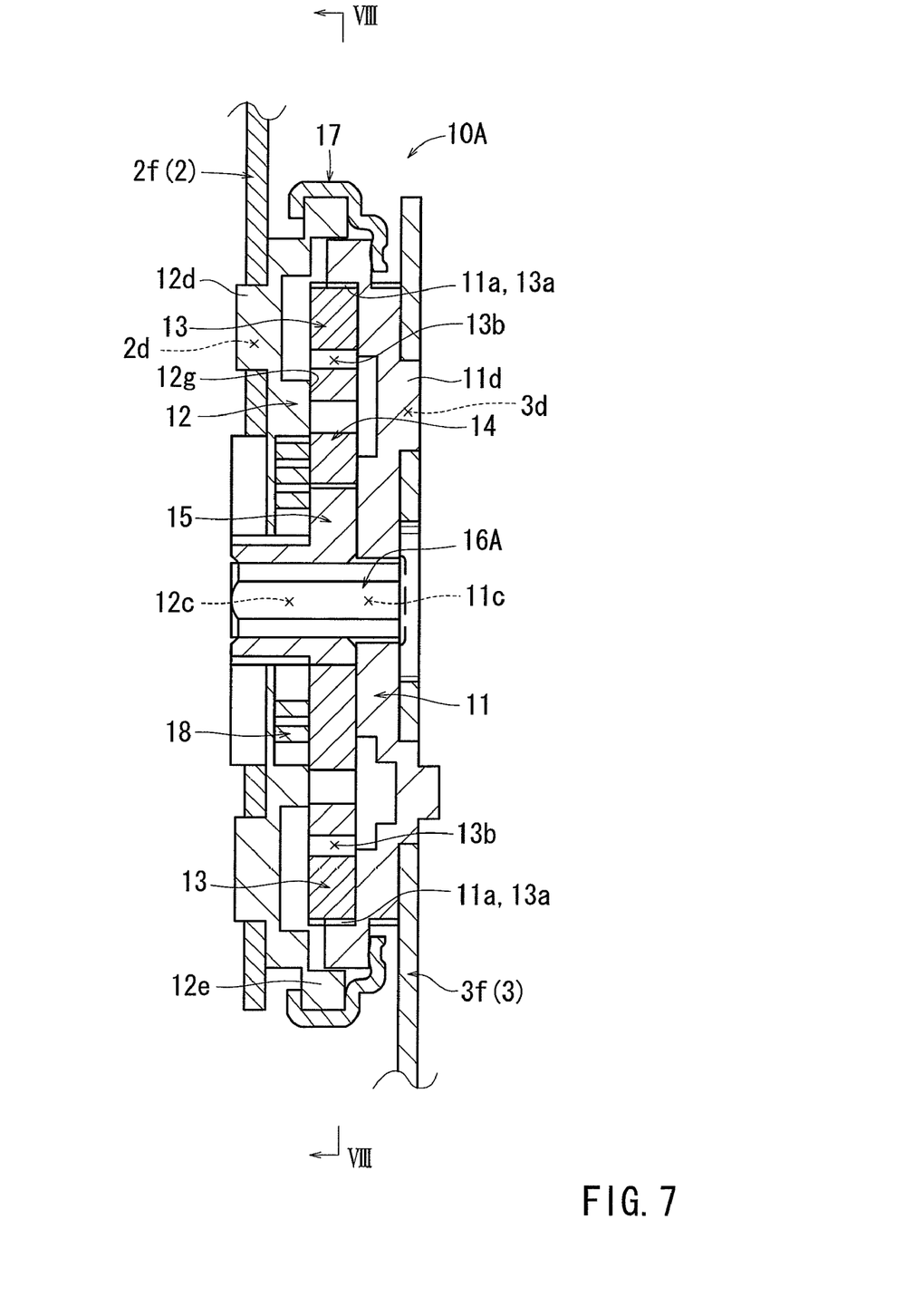
FIG. 7 is a structural view, which illustrates an inner structure of the reclining mechanism.

As shown in FIG. 7, the reclining mechanism 10A has a ratchet 11, a guide 12, pawls 13 and 13, an pusher member 14, a cam member 15, a operation shaft 16A as previously described, a set plate 17 and a spiral spring 18.

Figure 8:
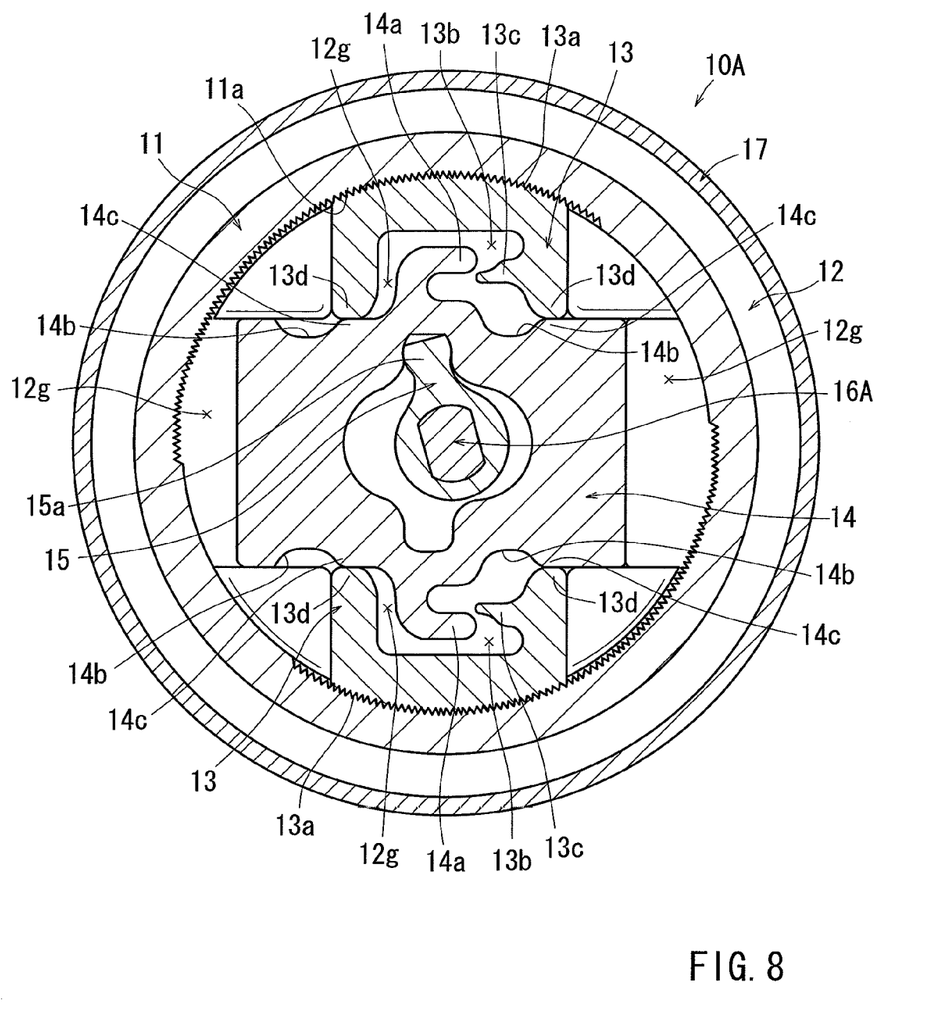
FIG. 8 is a sectional view taken along line VIII-VIII of FIG. 7.

More specifically, the ratchet 11 is formed in substantially a disc-shape. A peripheral edge of the disc-shaped ratchet 11 is formed with a cylindrical portion that protrudes in the axial direction. This cylindrical portion is formed by half blanking the ratchet 11 in the axial direction (thickness direction) thereof. As shown in FIG. 8, inner teeth 11a are formed along an inner circumferential surface of the cylindrical portion.

With reference to FIG. 7 again, a center of the disc-shaped ratchet 11 is formed with a through-hole 11c extending in the axial direction. The operation shaft 16A is inserted into the through-hole 11c.

The ratchet 11 is integrally connected to a cushion frame 3f constituting a frame of the seat cushion 3. More specifically, an outer surface of the ratchet 11 is formed with a plurality of dowels 11d protruding in the axial direction. The dowels 11d are formed at positions that are radially spaced apart from the through-hole 11c. The dowels 11d are formed by half blanking the ratchet 11 in the axial direction, and are positioned in a circumferential direction of the ratchet 11. Further, the dowels 11d are fitted into corresponding dowel holes 3a formed in the cushion frame 3f and are integrally fusion-bonded thereto. Thus, the ratchet 11 and the cushion frame 3f are integrally bonded in a condition that their surfaces contact each other.

Next, the guide 12 will be described. The guide 12 is formed in substantially a disc-shape. The guide 12 and the ratchet 11 are assembled such that their inner surfaces contact each other. A peripheral edge of the disc-shaped guide 12 is formed with a cylindrical surrounding portion 12e axially protruding therealong. The surrounding portion 12e is formed by half blanking the guide 12 in the axial direction. The surrounding portion 12e is shaped so as to surround the cylindrical portion formed in the ratchet 11 from the outer circumferential side thereof, thereby preventing it from radially moving. Further, upon engagement of the surrounding portion 12e and the cylindrical portion of the ratchet 11, the guide 12 and the ratchet 11 are assembled together so as to be capable of relatively axially rotating. In a condition that the guide 12 and the ratchet 11 are assembled together, the inner teeth 11a formed in the ratchet 11 are exposed to an inner space formed between the inner surfaces of the guide and ratchet.

Further, an axially extending through-hole 12c is formed in a central portion of the disc-shaped guide 12. The operation shaft 16A is inserted into the through-hole 12c.

The guide 12 is integrally connected to a back frame 2f constituting a frame of the seat back 2. More specifically, an outer surface of the guide 12 is formed with a plurality of dowels 12d protruding in the axial direction. The dowels 12d are formed at positions that are radially spaced apart from the through-hole 12c. The dowels 12d are formed by half blanking the guide 12 in the axial direction, and are positioned in a circumferential direction of the guide 12. Further, the dowels 12d are fitted into corresponding dowel holes 2a formed in the back frame 2f and are integrally fusion-bonded thereto. Thus, the guide 12 and the back frame 2f are integrally bonded in a condition that their surfaces contact each other.

As shown in FIG. 8, a recess 12g having a cross-shape is formed in the inner surface of the guide 12. The recess 12g is formed by half blanking the guide 12 in a thickness direction thereof, and the pair of pawls 13 and 13, which will be described hereinafter, are respectively disposed in the opposed vertical recess portions of the recess 12g as seen in the drawing. Thus, the pawls 13 and 13 are capable of sliding on the inner surface of the guide 12 along the recess portions, so as to move only radially inwardly and outwardly (vertically as seen in the drawing). Conversely, the pusher member 14, which will be described hereinafter, is disposed in the opposed lateral recess portions of the recess 12g as seen in the drawing. The pusher member 14 is disposed so as to extend between the right and left recess portions. Thus, the pusher member 14 is capable of sliding on the inner surface of the guide 12 along the recess portions, so as to move only radially inwardly and outwardly (laterally as seen in the drawing).

Next, the pair of pawls 13 and 13 will be described. As shown in FIG. 8, the pawls 13 and 13 are formed in a piece-shape and are respectively disposed in the recess 12g formed in the guide 12 so as to be slidable only radially inwardly and outwardly. Referring to FIG. 7 again, the pawls 13 and 13, when combined with the guide 12 and the ratchet 11, are held between those inner surfaces, so that their movement in the axial direction is restrained.

Outer teeth 13a and 13a are respectively formed in an outer peripheral surfaces of the pawls 13 and 13. The pawls 13 and 13 are slid radially outwardly, the outer teeth 13a and 13a can mesh with the inner teeth 11a that are exposed in their moving directions. In a condition that the outer teeth 13a and 13a of the pawls 13 and 13 and the inner teeth 11a of the ratchet 11 mesh each other, relative rotation of the guide 12 slidably guiding side surfaces of the pawls 13 and 13 and the ratchet 11 meshing the pawls 13 and 13 is restricted. That is, the reclining mechanism 10A is in the locking condition.

Further, the pawls 13 and 13 are respectively formed with grooves 13b and 13b at radially inner side portions thereof. The grooves 13b and 13b are formed in a recessed-shape, so as to receive the hook portions 14a and 14a formed in the pusher member 14 which will be described hereinafter.

Further, engagement portions 13c and 13c are formed in the pawls 13 and 13 at radially inner right end portions thereof as seen in the drawing, so as to be respectively shaped so as to protrude toward the grooves 13b and 13b. As will be described hereinafter with reference to FIG. 9, when the pusher member 14 is slid rightward as seen in the drawing from a condition shown in FIG. 8, the engagement portions 13 and 13c slidably engage the hook portions 14a and 14a. Each of the engagement portions 13 and 13c has an inclined contact surface that can contact the hook portions 14a and 14a, so as to be pulled radially inwardly by the hook portions 14a and 14a when the pusher member 14 slides rightward as seen in the drawing. By this radially inwardly pulling motion, the pawls 13 and 13 are retracted from meshing positions in which they mesh the inner teeth 11a of the ratchet 11, so that the reclining mechanism 10A is switched to the unlocking condition.

Further, leg portions 13d and 13d are respectively formed in the pawls 13 and 13 at both of the radially inner end portions thereof, so as to partially extend radially inwardly. As will be described hereinafter with reference to FIG. 8, the leg portions 13d and 13d are shaped to be pushed radially outwardly by shoulder portions 14c and 14c that are respectively formed in an upper and lower portions of the pusher member 14 when the pusher member 14 is slid leftward as seen in the drawing from a condition shown in FIG. 9.

Next, the pusher member 14 will be described. As shown in FIG. 8, the pusher member 14 is formed in a piece-shape and is disposed in the recess 12g formed in the guide 12 described above, so as to slide only radially inwardly and outwardly. Referring to FIG. 7 again, the pusher member 14, when combined with the guide 12 and the ratchet 11, is held between those inner surfaces, so that its movement in the axial direction is restrained.

Figure 9:
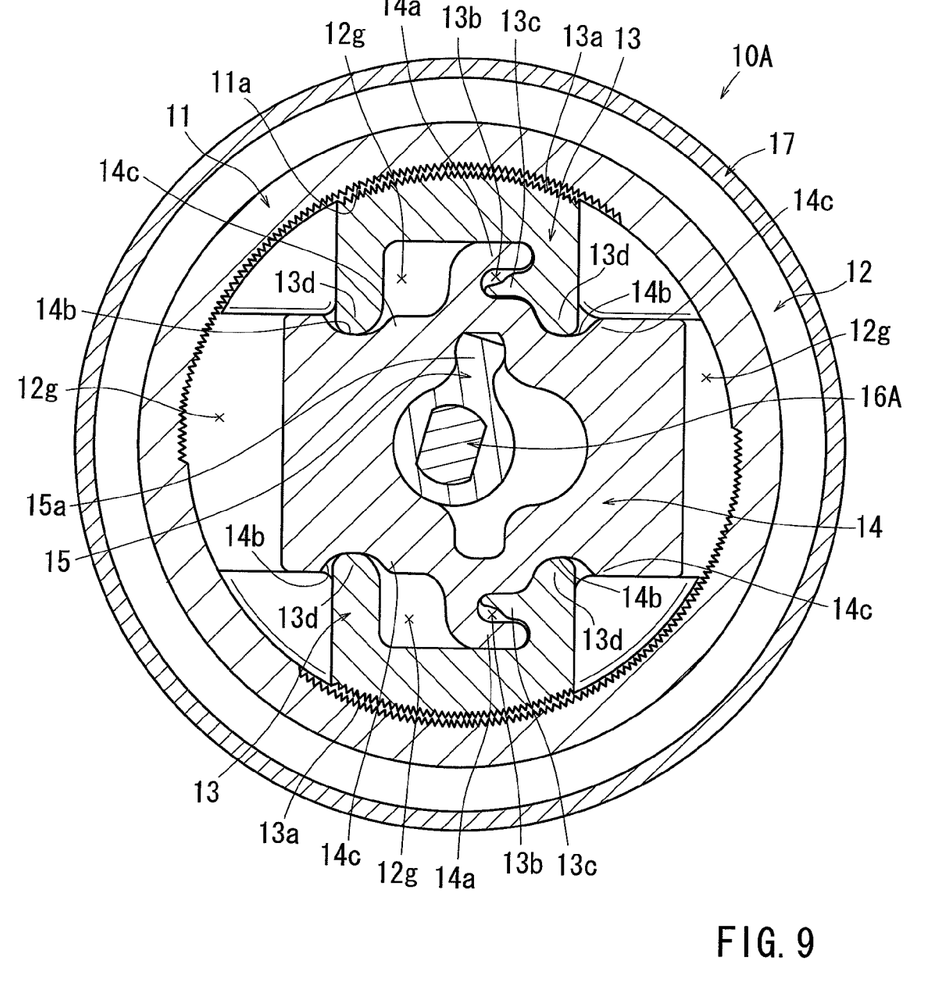
FIG. 9 is a sectional view of the reclining mechanism, which illustrates an unlocking condition thereof.

Referring to FIG. 8 again, the hook portions 14a and 14a are formed in the upper and lower portions of the pusher member 14 as seen in the drawing, so as to protrude toward the grooves 13b and 13b of the pawls 13 and 13. The hook portions 14a and 14a are formed as hooks that are bent rightward as seen in the drawing. As shown in FIG. 9, when the pusher member 14 is slid rightward as seen in the drawing from the condition of FIG. 8, the hook portions 14a and 14a respectively engage the engagement portions 13 and 13c formed in the pawls 13 and 13, thereby pulling them radially inwardly. Further, the hook portions 14a and 14a are shaped so as to be disengaged from the engagement portions 13 and 13c when the pusher member 14 is slid leftward as seen in the drawing from the condition of FIG. 9.

Further, depressed portions 14b and 14b are respectively formed in the upper and lower portions of the pusher member 14 as seen in the drawing, more specifically, so as to be positioned on both sides of the hook portions 14a and 14a as seen in the drawing. The depressed portions 14b and 14b are respectively shaped so as to receive the leg portions 13d and 13d formed in the pawls 13 and 13 when the pusher member 14 is slid rightward as seen in the drawing from the condition of FIG. 8. As a result, the pawls 13 and 13 are permitted to move radially inwardly.

Further, the shoulder portions 14c and 14c are formed in the upper and lower portions of the pusher member 14 as seen in the drawing, so as to be positioned on the right-hand side of the depressed portions 14b and 14b as seen in the drawing. The shoulder portions 14c and 14c are shaped so as to engage the leg portions 13d and 13d of the pawls 13 and 13 that are received in the depressed portions 14b and 14b when the pusher member 14 is slid leftward as seen in the drawing from the position of FIG. 9, thereby pushing the pawls 13 and 13 radially outwardly.

Further, an axially extending through-hole 14d is formed in a central portion of the pusher member 14. A cam member 15 integrally connected to the operation shaft 16A is inserted into the through-hole 14d. The through-hole 14d is shaped such that the cam member 15, having a protrusion 15a, can be axially rotated therein.

Next, the cam member 15 will be described. The cam member 15 is positioned in the through-hole 14d formed in the pusher member 14 described above. The cam member 15 is relatively unrotatably connected to the operation shaft 16A, so as to be rotated integrally with the rotation shaft 16A when the shaft axially rotates. Further, upon this axial rotation, the cam member 15 presses an inner circumferential surface of the through-hole 14d via the protrusion 15a, thereby sliding the pusher member 14 rightward and leftward as seen in the drawing. The cam member 15 is normally biased counter-clockwise in FIG. 8 by the spiral spring 18 (see FIG. 7) that is positioned between the cam member and the guide 12. As a result, as shown in FIG. 8, the cam member 15 normally slides the pusher member 14 leftward as seen in the drawing, thereby maintaining the locking condition in which the pawls 13 and 13 are pressed against the inner teeth 11a of the ratchet 11 so as to be meshed therewith. Further, when the operation shaft 16A is rotated clockwise, the cam member 15 is rotated in the same direction against a biasing force mentioned above. As a result, as shown in FIG. 9, the cam member 15 slides the pusher member 14 leftward as seen in the drawing, thereby changing to the unlocking condition in which the pawls 13 and 13 are retracted so as to be disengaged from the inner teeth 11a of the ratchet 11. Further, when rotational operation of the operation shaft 16A is released, the cam member 15 can be automatically returned to the condition shown in FIG. 8 via the above-mentioned biasing force.

Next, the set plate 17 will be described. As shown in FIG. 7, the set plate 17 is formed in a stepped cylindrical (annular) configuration by half blanking a thin plate-shaped disc member in the axial direction. The set plate 17 functions as a clamping member for clamping the ratchet 11 and the guide 12 in the thickness direction (the axial direction).

Figure 5:
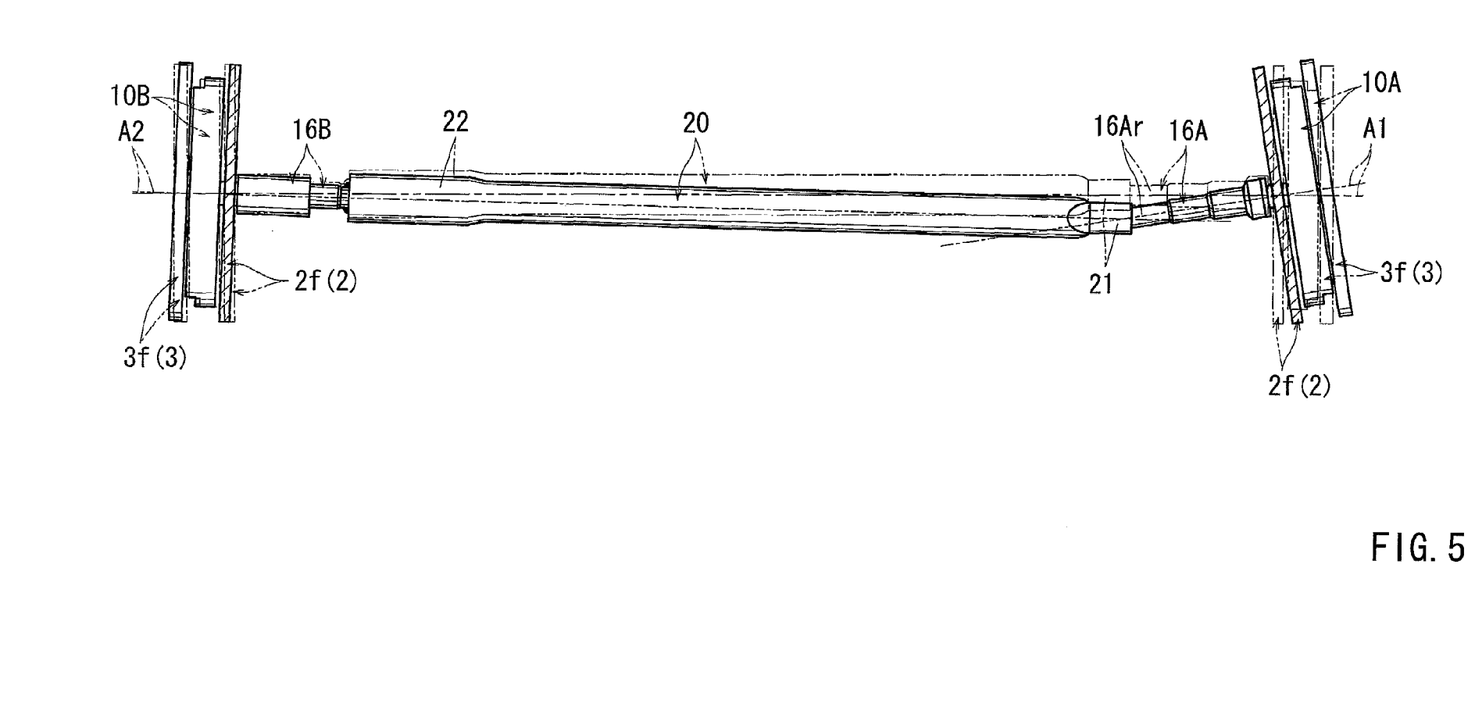
FIG. 5 is a plan view, which illustrates a condition in which transmission of unlocking motion between reclining mechanisms is inhibited.

Referring to FIG. 2 again, the reclining mechanisms 10A and 10B constructed as described above can be deformed or displaced as indicated by solid lines of FIG. 5 if the load is disproportionately applied to the seat back 2 when they are in the locking condition.

In particular, the back frames 2f and 2f and the cushion frames 3f and 3f, integrally connected to the reclining mechanisms 10A and 10B, are spaced away from each other along the width direction by a distance corresponding to a thickness of the reclining mechanisms 10A and 10B. Therefore, for example, when the load from behind (the load applied from an upper side toward a lower side in the drawing) is disproportionately exerted on a position adjacent to the back frame 2f positioned on the right-hand side as seen in the drawing is applied, the right back frame 2f is rotated in the forward tilting direction (downwardly as seen in the drawing) around the operation shaft 16A. As a result, the right cushion frame 3f integral with the right back frame 2f can be deformed, so as to be expanded in the width direction with respect to the left cushion frame 3f. As a result of this deformation, the reclining mechanisms 10A and 10B are deformed or displaced while axes A1 and A2 of the operation shafts 16A and 16B thereof are bent in a V-shape. In particular, the reclining mechanisms 10A and 10B are displaced at an insertion-coupling portion the right operation shaft 16A and the connection member 20 until the right operation shaft 16A and the connection member 20 reach a bent angular position in which their coupling condition is released. As a result, even if the relatively different rotational displacement that permit to release the locking condition is generated between the reclining mechanisms 10A and 10B that are arranged in rotation synchronism with each other as describe above, the operational force of the unlocking motion can be prevented from transmitting from the right operation shaft 16A to the left operation shaft 16B via the connection member 20.

Figure 2:
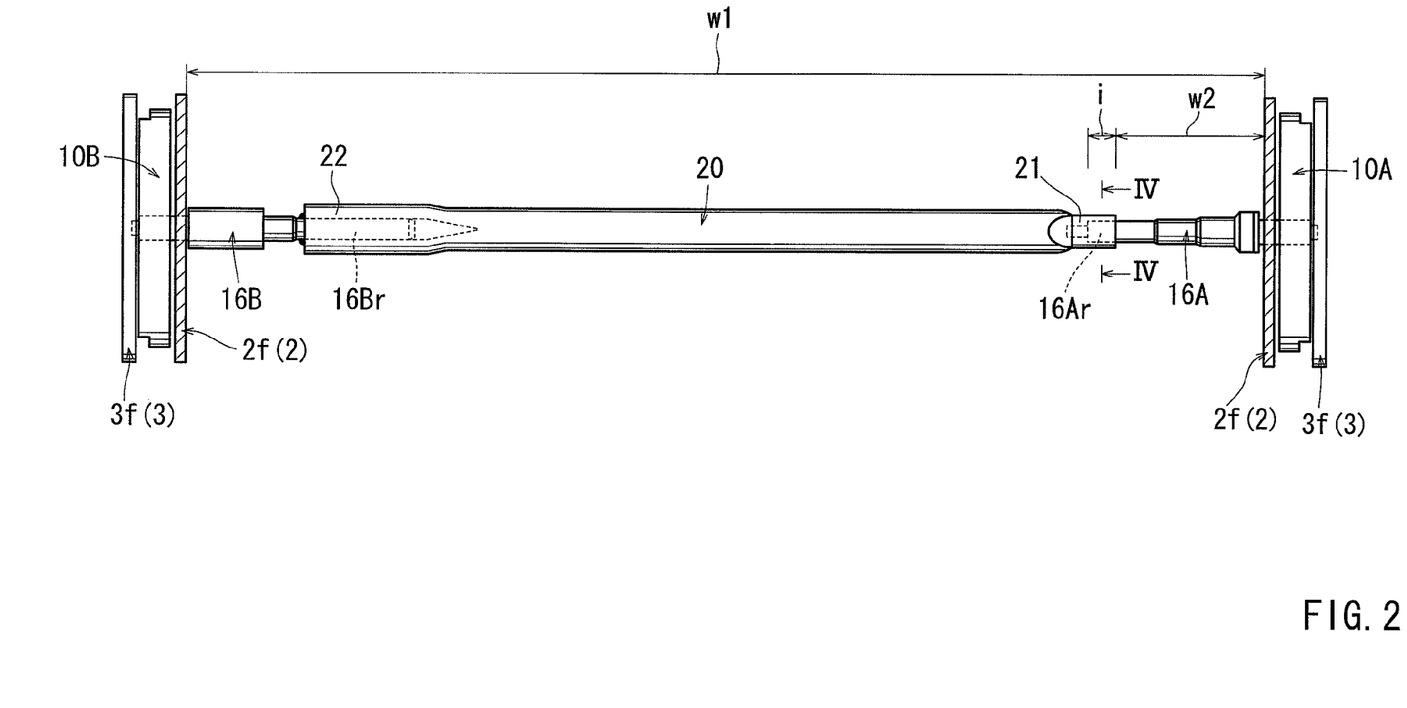
FIG. 2 is a sectional view taken along line II-II of FIG. 1.

In the following, a connection structure of the operation shafts 16A and 16B and the connection member 20 will be described in detail. As shown in FIG. 2, the operation shafts 16A and 16B are respectively inserted into coupling end portions 21 and 22 formed in end portions of the connection member 20, so as to be relatively axially unrotatably coupled to each other.

Figure 3:
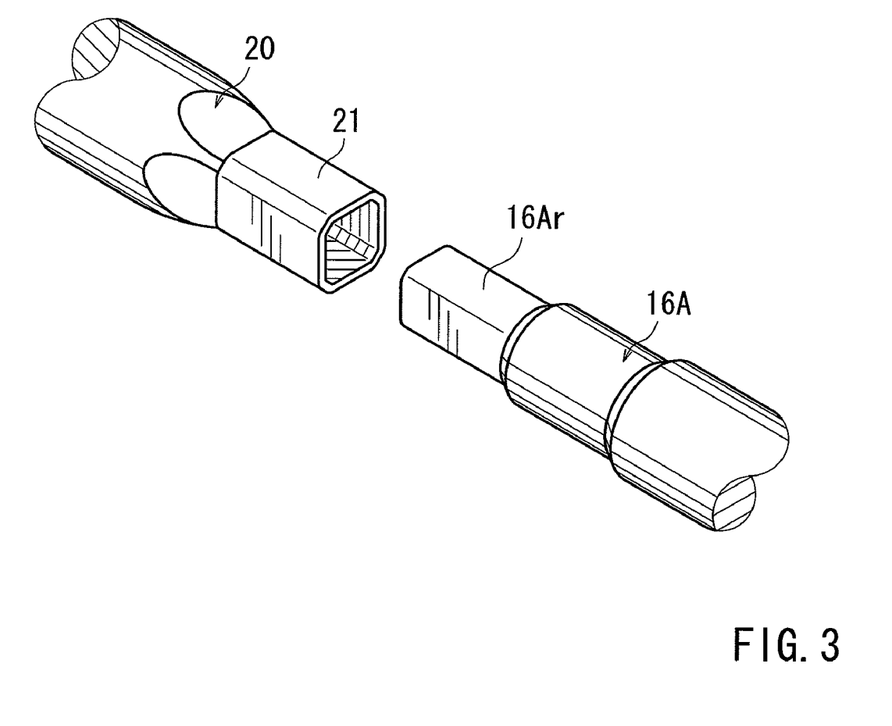
FIG. 3 is an enlarged perspective view of a connection structure of an operation shaft and a connection member.
Figure 4:
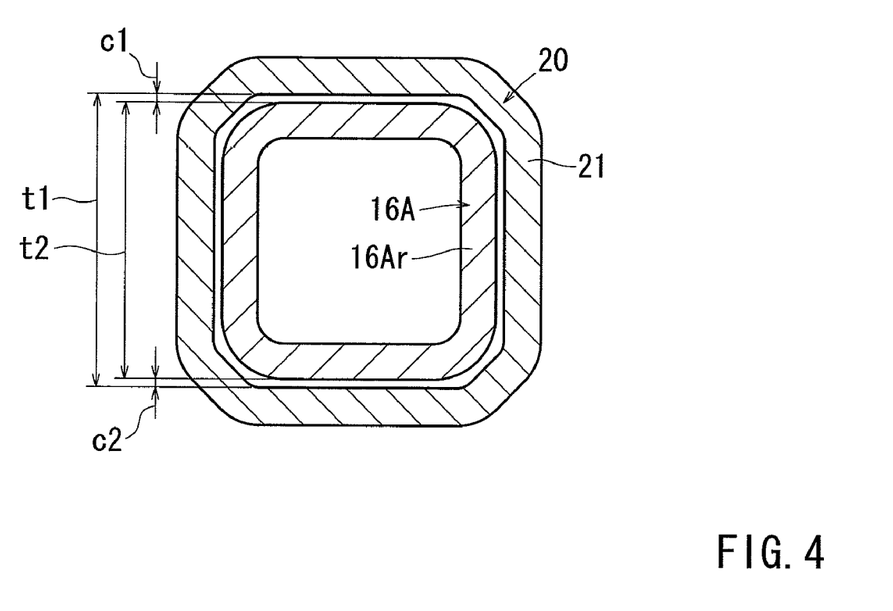
FIG. 4 is a sectional view taken along line IV-IV of FIG. 2.

In particular, as shown in FIG. 3, an insertion end portion 16Ar of the operation shaft 16A positioned on a vehicle inner side (a right-hand side as seen in the drawing) has a rectangular tubular shape that can be inserted into the rectangular tubular-shaped coupling end portion 21 formed in the right end portion of the connection member 20. Therefore, referring to FIG. 2 again, when the insertion end portion 16Ar is inserted into the coupling end portion 21, the right operation shaft 16A can be connected to the connection member 20 so as to transmit rotational motion thereto. An insertion distance i of the insertion end portion 16Ar to the coupling end portion 21 is 10 mm. Further, a width w1 between the reclining mechanisms 10A and 10B is 371 mm, and a width W2 between a right end of the connection member 20 as seen in the drawing and the inner reclining mechanism 10A is 47 mm. Now, FIG. 4 is a sectional view illustrating a condition in which the right operation shaft 16A and the connection member 20 are coupled to each other. As shown in the drawing, the operation shaft 16A and the connection member 20 are coupled to each other via a so-called loose coupling in which a slight gap is left therebetween. In particular, a vertical and lateral inner diameter t1 of the coupling end portion 21 is 6.25 mm, and a vertical and lateral outer diameter t2 of the insertion end portion 16Ar is 6.20 mm. As a result, vertical and lateral gaps c1 and c2 therebetween are 0.025 mm.

Referring to FIG. 2 again, the insertion end portion 16Br of the operation shaft 16B on a vehicle outer side (a left-hand side as seen in the drawing) is inserted into the coupling end portion 22 formed in the left end portion of the connection member 20, and is fusion-bonded thereto. As a result, the left operation shaft 16B and the connection member 20 are rigidly integrally connected so that the rotational motion is transmitted therebetween.

In assembling the operation shafts 16A and 16B with the connection member 20, the left operation shaft 16B is integrally fusion-bonded to the connection member 20, and then the right operation shaft 16A is inserted thereinto. This permits an excellent assembling property of the seat reclining device. Further, the operation shafts 16A and 16B and the connection member 20 are formed from metallic materials, so as to ensure the transmission of the rotational force due to their torsional rigidity.

As indicated by solid lines in FIG. 5, in a joint structure formed in which the right operation shaft 16A and the connection member 20 are coupled as described above, when the load is disproportionately exerted on the seat back 2 describe above, the axes A1 and A2 of the operation shafts 16A and 16B of the two reclining mechanisms 10A and 10B are bent in the V-shape in a manner that the coupling condition between the right operation shaft 16A and the connection member 20 is released. That is, the right hand operation shaft 16A and the connection member 20 are connected with each other via the loose coupling having a relatively small insertion distance i. As a result, when the load as describe above is applied, the bending displacement into the V-shape is promoted at this joint portion as a forward tilting rotation of the seat back 2 proceeds. When the respective axes A1 and A2 of the operation shafts 16A and 16B are bent in the V-shape and the coupling condition of the right operation shaft 16A and the connection member 20 is decoupled, the operational force of the unlocking motion resulting from the forward tilting rotation of the right reclining mechanism 10A can be prevented from being transmitted to the left operation shaft 16B from the right operation shaft 16A via the connection member 20.

That is, when the right reclining mechanism 10A in the locking condition rotates in the forward tilting direction, the right operation shaft 16A also axially rotates integrally therewith in the forward tilting direction. Normally, the rotational force of the right operational shaft 16A can be transmitted to the left operation shaft 16B via the connection member 20. As a result, the left operation shaft 16B can be relatively axially rotated in the unlocking direction with respect to the left reclining mechanism 10B which is prevented from rotating in the forward tilting direction, so that the left reclining mechanism 10B can be switched to the unlocking condition. However, as described above, in this embodiment, because the transmission of this unlocking motion can be prevented, the reclining mechanism 10B can be prevented from being switched to the unlocking condition.

Next, a method of using this embodiment will be described.

Referring to FIG. 1, when the heavy object such as the wine case (not shown) hits the back side of the seat back 2 having the reclining mechanisms 10A and 10B in the locking condition, if the heavy object hits a position deflected to an inner side (a right-hand side as seen in the drawing), due to the load applied thereto, the inner reclining mechanism 10A is relatively rotationally displaced in the forward tilting direction with respect to the outer reclining mechanism 10B. As a result, as indicated by solid lines of FIG. 5, the axes A1 and A2 of the operation shafts 16A and 16B are bent in the V-shape, so that the coupling condition of the right operation shaft 16A and the connection member 20 is released. As a result, the unlocking motion can be prevented from being transmitted from the right operation shaft 16A to the left operation shaft 16B. Therefore, the reclining mechanism 10B can be prevented from being switched to the unlocking condition.

In this way, according to the seat reclining device of this embodiment, when a large load is applied so as to generate a relatively rotational deviation to a rotational position between the two reclining mechanisms 10A and 10B, the unlocking motion can be prevented from transmitting between the two reclining mechanisms 10A and 10B by a transmission preventing mechanism. Thus, the locking condition of the reclining mechanisms 10A and 10B can be prevented from being released.

Further, in this embodiment, when the above-mentioned load is applied, the displacement is promoted in a direction that the coupling condition of one of the operation shafts 16A and the connection member 20 is decoupled, so that the coupling condition thereof can be easily released. Therefore, the transmission of the unlocking motion can be stably prevented. Further, because the operation shafts 16A and 16B and the connection member 20 are constructed so as to be displaced in the V-shape without deforming, the components can be re-used as they are even after they are displaced in the V-shape. This is advantageous. Further, the above-mentioned structure to release the coupling condition can be performed by a relatively simple construction in which a distance of the insertion-coupling of the operation shaft 16A and the connection member 20 is shortened and they are coupled to each other via the loose coupling. Therefore, the unlocking motion can be prevented from transmitting without changing the construction of the conventional reclining mechanisms 10A and 10B.

Further, the unlocking motion can be advantageously prevented from transmitting using the displacement of the respective operation shafts 16A and 16B of the reclining mechanisms 10A and 10B in relation to a connection structure of the seat back 2 and the seat cushion 3.

Second Embodiment

In a second embodiment, a deformation promoting portion is provided on the coupling end portion 21 of the connection member 20. In this embodiment, the portions that have substantially the same construction and effect as those of the seat reclining device of the first embodiment are indicated by the same reference symbols, and a description thereof will be omitted. Only construction that is different from those of the first embodiment is explained by applying different reference symbols.

Figure 10:
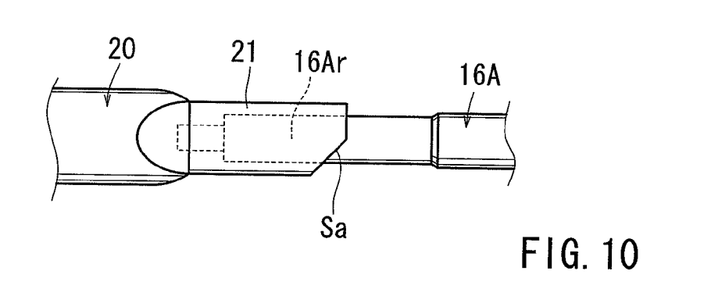
FIG. 10 is a partially enlarged view of a connection structure of an operation shaft and a connection member according to a second embodiment.

A typical example of the second embodiment will be described with reference to FIG. 10. In this embodiment, the coupling end portion 21 of the connection member 20 into which the inner side operation shaft 16A is inserted is formed with a cutout portion Sa that is formed by partially cutting the coupling end portion. The cutout portion Sa corresponds to the deformation promoting portion of the present invention. The cutout portion Sa is formed in a front portion of the coupling end portion 21, so as to reduce modulus of section of the coupling end portion 21 with respect to a loading direction that bends the respective axes A1 and A2 of the operation shafts 16A and 16B in the V-shape. Further, due to this cutout shape, the insertion distance of the operation shaft 16A into the connection member 20 is reduced in a front side. Therefore, upon V-shape bending, the coupling condition can be easily released.

Figure 11:
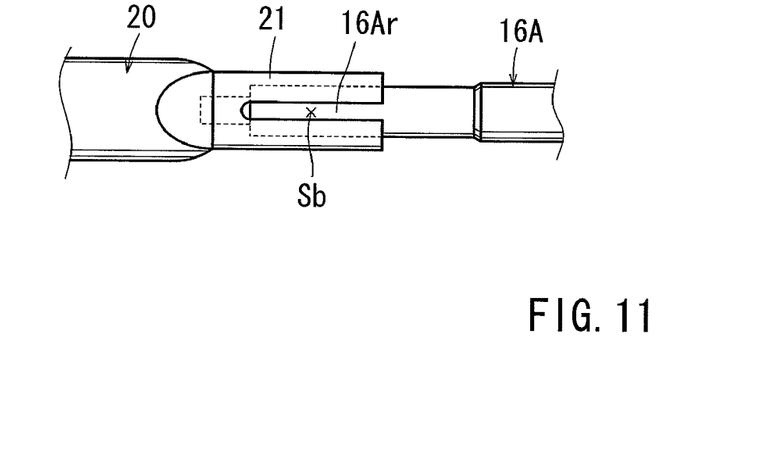
FIG. 11 is a partially enlarged view of a first modified form of the connection structure according to the second embodiment.
Figure 12:
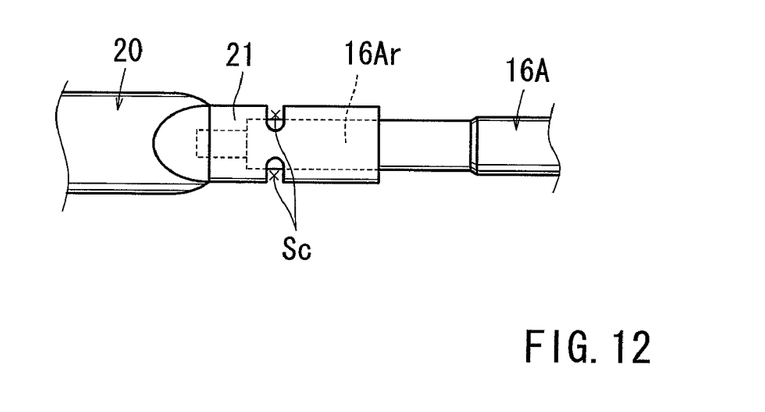
FIG. 12 is a partially enlarged view of a second modified form of the connection structure according to the second embodiment.

This deformation promoting portion can be formed, for example, by slots Sb or slots Sc shown in FIGS. 11 and 12 in place of the cutout portion Sa described above. The former, i.e., the slots Sb shown in FIG. 11, are formed as thin elongated holes that are formed in the coupling end portion 21 of the connection member 20 so as to axially extend therealong. The latter, i.e., the slots Sc shown in FIG. 12, are formed as removed portions that are formed by partially circumferentially removing a part of the coupling end portion 21 of the connection member 20. Due to formation of the slots Sb and Sb, the coupling end portion 21 can be easily deformed (easily ruptured) when the above-mentioned load is applied thereto, so that the joint structure formed of the operation shaft 16A and the connection member 20 can be easily bent in the V-shape. In this embodiment, the insertion distance of the operation shaft 16Ar into the connection member 20 is 20 mm.

In the joint structure described above, when a load is applied thereto in a direction that bends the respective axes A1 and A2 of the operation shafts 16A and 16B in the V-shape, deformation of the joint portion between the connection member 20 and the operation shaft 16A is promoted by the slots Sb or the slots Sc. Further, as a result of this deformation, the joint structure is deformed in the V-shape so as to be changed to a condition in which the unlocking motion can be prevented from being transmitted from the right operation shaft 16A to the left operation shaft 16B. Therefore, the reclining mechanism 10B can be prevented from being switched to the unlocking condition.

In this way, in the seat reclining device of this embodiment, because the joint portion between the connection member 20 and the operation shaft 16A can be easily deformed, the unlocking motion can be advantageously prevented from transmitting. Further, because only the connection member 20 can be deformed, the conventional reclining mechanisms 10A and 10B can be used without changing construction thereof. In addition, deformability of the joint portion can be relatively easily adjusted by changing the shape of the slots Sb and the slots Sb formed in the connection member 20.

Third Embodiment

In a third embodiment, a deformation promoting portion is provided on the right operation shaft 16A. In this embodiment, the portions that have substantially the same construction and effect as those of the seat reclining device of the first and second embodiments are indicated by the same reference symbols, and a description thereof will be omitted. Only construction that is different from those of the first and second embodiments is explained by applying different reference symbols.

Figure 13:
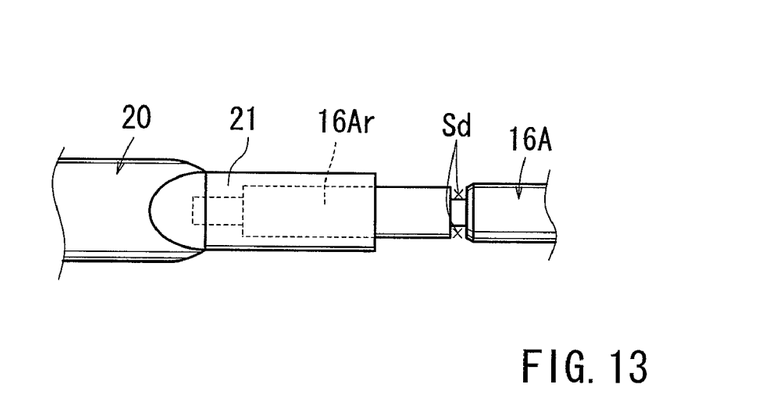
FIG. 13 is a partially enlarged view of a connection structure of an operation shaft and a connection member according to a third embodiment.

As shown in FIG. 13, in this embodiment, the inner operation shaft 16A has a small diameter portion Sd that is partially reduced in diameter. The small diameter portion Sd corresponds to the deformation promoting portion of the present invention. Due to the small diameter portion Sd, modulus of section of the operation shaft 16A is reduced with respect to a loading direction that bends the respective axes A1 and A2 of the operation shafts 16A and 16B in the V-shape.

In this way, according to the seat reclining device of this embodiment, because the operation shaft 16A can be easily deformed, the unlocking motion can be advantageously prevented from transmitting. In addition, deformability of the joint portion can be relatively easily adjusted by changing the shape of the small diameter portion Sd formed in the operation shaft 16A.

Although the three embodiments of the present invention are described, the present invention can be carried out in various modified forms.

For example, in the first embodiment, the joint portion between the operation shaft and the connection member is released, thereby preventing transmission of the rotational motion. However, these components can be constructed such that even if the joint portion is not substantially decoupled, they are bent in the V-shape to a bent angular condition so that the transmission of the rotational motion can be prevented. Further, although, in the second and third embodiments, the joint portion is deformed to the bent angular condition in which the transmission of the rotational motion can be prevented, the joint portion can be modified such that a connecting condition of the two components can be released when the joint portion is ruptured.

Each of the above-mentioned embodiments have been described on the assumption that the heavy object such as the wine case hits the back side of the seat back 2 at the position deflected to the inner side thereof. Therefore, under the assumption that the heavy object hits the back side of the seat back 2 at the position deflected to an outer side thereof, the transmission preventing mechanism in these embodiments can be provided to an outer joint structure between the inner operation shaft and the connection member. Also, the transmission preventing mechanism can be provided to both of the inner and outer joint structures.

Further, it is not necessary for the transmission preventing mechanism to be provided on the joint portion between the operation shaft and the connection member. Therefore, it can be provided to any one of a series of structural components axially connected to each other. For example, a joint may be provided to a part of the connection member. Further, it is possible to provide a pressing member that is arranged to receive the load disproportionately applied to the seat back 2 so as to press and bend the operation shaft and the connection member, so that the operation shaft and the connection member can be deformed, thereby preventing transmission of power. In this case, there is no need to form the deformation promoting portion such as the slots in the operation shaft and the connection member. This is advantageous in that deterioration in rotation transmitting function such as reduction of the torsional rigidity of the connection member can be avoided.

The structural relation such as the insertion distance of the operation shaft into the connection member and the coupling thereof can be suitably determined based on materials and sizes of the related structural components. Therefore, the values given in the above-mentioned embodiments should not be construed restrictively.

Further, the deformation promoting portion is not restricted to those of the above-mentioned embodiments. For example, it can be formed as a thinned portion and a bent portion that are partly formed in each of the components, so as to be easily deformed. Further, the insertion distance of the operation shaft into the connection member can be simply shortened, so that these components can be easily bent in the V-shape (decoupled). However, in all of the above-mentioned cases, the transmission preventing mechanism should be provided such that the transmitting function of the unlocking motion of the reclining mechanism in normal use is not reduced.

The invention claimed is:

1. A seat reclining device, comprising:
reclining mechanisms that are respectively provided on right and left sides of a seat so as to adjust an inclination angle of a seat back; and
a connection member for synchronizing locking and unlocking motion of the reclining mechanisms, the connection member being disposed between the right and left reclining mechanisms,
wherein the connection member connects operation shafts for respectively switching the right and left reclining mechanisms between a locking condition and an unlocking condition thereof in a condition that power can be transmitted therebetween,
wherein the reclining mechanisms are disposed such that axes of their operation shafts are normally aligned with each other, wherein when a load is laterally disproportionately applied to the seat back in the locking condition of the reclining mechanisms, one of the reclining mechanisms relatively rotates together with the operation shaft thereof with respect to the other of the reclining mechanisms, so as to rotate the operation shaft of the other of the reclining mechanisms, thereby relatively releasing the locking condition of the other of the reclining mechanisms,
wherein the connection member and the operation shaft of the other of the reclining mechanisms are connected by a coupling connection in which they are axially inserted to each other, so that the power can be transmitted therebetween, wherein the coupling connection portion of the connection member and the operation shaft of one of the reclining mechanisms is provided with a transmission preventing mechanism that is capable of preventing the transmission of the power between the operation shaft and the connection member when the load is laterally disproportionately applied to the seat back, and
wherein the transmission preventing mechanism is constructed such that when the load is laterally disproportionately applied to the seat back, the one of the reclining mechanisms relatively rotates together with the operation shaft thereof and the connection portion of the operation shaft of one of the reclining mechanisms and the connection member is expanded in a width direction so as to be bent in a V-shape, thereby preventing the transmission of the power between the operation shaft and the connection member.

2. A seat reclining device as defined in claim 1, wherein the transmission preventing mechanism is provided on the connection member.

3. A seat reclining device as defined in claim 1, wherein the transmission preventing mechanism is provided on the operation shafts of the reclining mechanisms.

4. A seat reclining device as defined in claim 1,
wherein the transmission preventing mechanism is constructed such that when the load is laterally disproportionately applied to the seat back, an insertion-coupling condition between the connection member and the operation shafts can be decoupled by bending to a V-shaped bent angle.

5. A seat reclining device as defined in claim 1, wherein the transmission preventing mechanism includes a deformation promoting portion formed in at least one of the connection member and the operation shafts that constitute the coupling joint, and
wherein an insertion-coupling condition between the connection member and the operation shafts can be easily bent to a V-shape due to the deformation promoting portion.

* * * * *